United States Patent
Ammler (10) Patent No.: US 10,072,754 B2
(45) Date of Patent: Sep. 11, 2018

(54) METHOD FOR A HYDRAULIC SYSTEM FOR A DUAL-CLUTCH GEARBOX

(71) Applicant: AUDI AG, Ingolstadt (DE)

(72) Inventor: Stefan Ammler, Bergheim (DE)

(73) Assignee: Audi AG, Ingolstadt (DE)

( * ) Notice: Subject to any disclaimer, the term of this patent is extended or adjusted under 35 U.S.C. 154(b) by 308 days.

(21) Appl. No.: 14/892,930

(22) PCT Filed: May 20, 2014

(86) PCT No.: PCT/EP2014/001345
§ 371 (c)(1),
(2) Date: Nov. 20, 2015

(87) PCT Pub. No.: WO2014/187556
PCT Pub. Date: Nov. 27, 2014

(65) Prior Publication Data
US 2016/0116061 A1   Apr. 28, 2016

(30) Foreign Application Priority Data
May 23, 2013  (DE) .................. 10 2013 008 741

(51) Int. Cl.
*F16H 61/00*  (2006.01)
*F16H 61/688*  (2006.01)

(52) U.S. Cl.
CPC ....... *F16H 61/688* (2013.01); *F16H 61/0021* (2013.01); *F16H 61/0031* (2013.01); *F16H 2061/0034* (2013.01)

(58) Field of Classification Search
CPC ............. F16H 61/0021; F16H 61/0031; F16H 61/688; F16H 2061/0034
See application file for complete search history.

(56) References Cited

U.S. PATENT DOCUMENTS 5,631,632 A   5/1997   Nakashima et al.
5,944,159 A   8/1999   Schneider et al.
(Continued)

FOREIGN PATENT DOCUMENTS

CN   102128260 A   7/2011
CN   102403935 A   4/2012
(Continued)

OTHER PUBLICATIONS

Chinese Search Report dated Aug. 1, 2016 with respect to counterpart Chinese patent application 201480029208.4.
(Continued)

*Primary Examiner* — Edwin A Young
(74) *Attorney, Agent, or Firm* — Henry M. Feiereisen LLC (57) ABSTRACT

A hydraulic system for an automatic gearbox for a motor vehicle, includes a high-pressure circuit which includes a pressure accumulator, at least one clutch and actuators, and a low-pressure circuit for cooling the clutch, the high-pressure circuit and the low-pressure circuit each containing a hydraulic cooling pump and a hydraulic charging pump that can be driven by a shared electric motor; and a controller which, when it is detected that the pressure accumulator needs to be charged, controls the electric motor to run at a charging setpoint speed, and/or, when it is detected that cooling is needed or another need exists, controls the electric motor to run at a cooling setpoint speed or another setpoint speed. The electric motor is paired with a current measuring device for measuring an actual current consumption and a rotational speed sensor for measuring an actual rotational speed. The controller has an analysis unit which uses the actual current consumption and the actual rotational speed, specifically from the comparison of the actual current con-
(Continued)

sumption with a reference value, to detect a need for charging of the pressure accumulator.

22 Claims, 9 Drawing Sheets

(56) References Cited

U.S. PATENT DOCUMENTS

| | | | |
|---|---|---|---|
| 2012/0144946 A1* | 6/2012 | Lundberg | F16H 61/0251 |
| | | | 74/473.11 |
| 2014/0345261 A1 | 11/2014 | Schuller et al. | |
| 2014/0346119 A1 | 11/2014 | Ammler et al. | |
| 2016/0108977 A1* | 4/2016 | Ammler | F16H 61/0031 |
| | | | 192/48.609 |

FOREIGN PATENT DOCUMENTS

| | | |
|---|---|---|
| CN | 102563048 A | 7/2012 |
| DE | 196 33 420 | 3/1997 |
| DE | 196 35 226 | 3/1997 |
| DE | 196 47 940 | 5/1998 |
| DE | 101 34 121 | 10/2002 |
| DE | 10 2004 046 950 | 4/2006 |
| DE | 10 2011 100 802 | 11/2012 |
| DE | 10 2011 100 836 | 11/2012 |
| DE | 10 2011 100 845 | 11/2012 |
| GB | 2 305 227 | 4/1997 |
| WO | WO 2010/063377 | 6/2010 |

OTHER PUBLICATIONS

Translation of Chinese Search Report dated Aug. 1, 2016 with respect to counterpart Chinese patent application 201480029208.4.

\* cited by examiner

METHOD FOR A HYDRAULIC SYSTEM FOR A DUAL-CLUTCH GEARBOX

CROSS-REFERENCES TO RELATED APPLICATIONS

This application is the U.S. National Stage of International Application No. PCT/EP2014/001345, filed May 20, 2014, which designated the United States and has been published as International Publication No. WO 2014/187556 and which claims the priority of German Patent Application, Serial No. 10 2013 008 741.4, filed May 23, 2013, pursuant to 35 U.S.C. 119(a)-(d).

BACKGROUND OF THE INVENTION

The invention relates to a hydraulic system for an automatic transmission, in particular a dual-clutch transmission, of a motor vehicle according, a motor vehicle with such a hydraulic system and a method for operating such a hydraulic system.

In a dual-clutch transmission gears can be changed fully automatically by means of two sub-transmissions. Torque transmission is accomplished via one of two clutches, which connects the two sub-transmissions with the drive. The clutches and the actuators for engaging the gears can be hydraulically actuated by means of a hydraulic system.

From DE 10 2011 100 836 A1 a generic hydraulic system is known which forms the starting point of the present invention. The present invention relates in particular to program modules, which are required for a signal processing of the actual current consumption of the pump drive in the hydraulic system. By means of this signal processing it is recognized whether or not a requirement for charging the pressure accumulator exists.

The hydraulic system known from DE 10 2011 100 836 A1 divided into a high-pressure circuit and a low-pressure circuit. In the high-pressure circuit a pressure accumulator is provided with which a strongly temperature-dependent accumulator pressure can be provided in the range of for example about 30 bar. In addition the hydraulically actuatable clutches and actuators (for example gear shift elements) are arranged in the high-pressure circuit. On the other hand the low-pressure circuit operates at a hydraulic pressure in the range of for example about 5 bar. The cooling of the sub-transmissions is accomplished by means of the low-pressure circuit via the hydraulic fluid.

In the generic hydraulic system the low-pressure circuit has a cooling hydraulic pump and the high-pressure circuit has a charging hydraulic pump with which the pressure accumulator is charged to the required accumulator pressure. The two hydraulic pumps are driven via a common drive shaft by means of a shared electric motor. The electric motor is controlled by a control device. When recognizing a requirement for charging the pressure accumulator, the electric motor is controlled to run at a charging setpoint speed. As an alternative and/or in addition the electric motor is controlled to run at a cooling setpoint speed when for example recognizing a requirement for cooling. In addition the high-pressure circuit and the low-pressure circuit can be connected via a bypass line with integrated control valve. The control valve can be switched between a charging position and a non-charging position (cooling position) without external energy input, i.e., automatically, in dependence on the accumulator pressure in the high-pressure circuit. In the charging position the hydraulic system operates in the charging mode (i.e., the charging hydraulic pump is fluidly coupled with the high-pressure circuit) and at high pump load with correspondingly high actual current consumption. In contrast, in the non-charging position (i.e., in the cooling position) of the control valve, the hydraulic system operates for example in a cooling mode or in another mode for example a filter-cleaning mode.

For reasons of clarity the following discussion mostly refers to the cooling position of the control valve. It is noted that the cooling position and the non-charging position of the control valve are identical. In addition for reasons of clarity the following discussion mostly uses the terms cooling mode and cooling speed. The cooling mode is merely an example for a non-charging mode and hence the term cooling mode can be replaced with the more general term non-charging mode.

In the cooling position of the control valve the charging pump, beside the cooling pump, is also fluidly connected with the low-pressure circuit and decoupled from the high-pressure circuit. In the cooling mode the hydraulic pumps operate—in contrast to the charging mode—at a lower pump load with correspondingly lower actual power consumption.

In the state of the art a requirement for charging the pressure accumulator is detected via a sensor, for example a pressure sensor arranged in the high-pressure circuit. As soon as the accumulator pressure falls below a predetermined lower threshold value the above-mentioned control valve automatically assumes its charging position. In addition the control device recognizes the requirement for charging the pressure accumulator by means of the sensor. When recognizing the requirement for charging the pressure accumulator, the control device controls the common electric motor to run at the charging setpoint speed, thereby charging the pressure accumulator in the high-pressure circuit. As soon as the accumulator pressure exceeds an upper threshold value, the above-mentioned control valve automatically assumes its cooling position. In addition the control device recognizes by means of the sensors that a requirement for charging the pressure accumulator no longer exists.

The arrangement of a sensor (for example a pressure sensor or valve position sensor) in the high-pressure circuit for recognizing a requirement for charging the pressure accumulator increases component costs. In addition the operation of the pressure sensor may be subject to malfunctions.

SUMMARY OF THE INVENTION

The object of the invention is to provide a method for a hydraulic system for an automatic transmission, in particular a dual-clutch transmission, of a motor vehicle in which a requirement for charging a pressure accumulator can be recognized.

The object is solved by the features of Preferred refinements of the invention are set forth in the dependent claims.

The invention is based on the fact that an actual current consumption of the shared electric motor of the hydraulic pumps is significantly higher during a charging mode for charging the pressure accumulator than the actual current consumption of the shared electric motor when the clutches have to be cooled. Taking the foregoing into account, the characterizing portion of patent claim 1 sets forth to use a current measuring device of the electric motor for detecting an actual current consumption and a rotational speed sensor for detecting an actual rotational speed of the electric motor for recognizing a requirement for charging the pressure accumulator. The control device of the hydraulic system has an analysis unit, which analyses the actual current consumption and the actual rotational speed and based thereon recognizes a requirement for charging the pressure accumulator. In the analysis preferably the actual current consumption can be compared with a reference value and a requirement for charging the pressure accumulator can be recognized based on this comparison. When recognizing a requirement for charging the pressure accumulator, the shared electric motor is controlled by the control device to run at a charging setpoint speed in order to increase the accumulator pressure in the high-pressure circuit.

As mentioned above, the cooling hydraulic pump and the charging hydraulic pump are driven by a shared electric motor, i.e., by controlling the control device with a charging setpoint speed, a cooling setpoint speed or with another requested rotational speed. When multiple different rotational speed requests exist the shared electric motor is controlled with the highest setpoint speed. The individual speed requests are prioritized in a comparer module, i.e., they are weighted according to relevance and according to the rotational speed value. This means that a rotational speed request of a lower rotational speed that is categorized as relevant can be prioritized, i.e., compared to a rotational speed request of a higher rotational speed that is categorized as less relevant.

With regard to a reliable detection of the requirement to charge, the control device has a constant-speed unit. By means of this unit it is detected whether the hydraulic pumps operate at a constant actual speed. In the presence of such a constant actual speed, the above-mentioned analysis unit is activated and depending on the case a requirement for charging is determined. In the absence of a constant actual rotational speed on the other hand the analysis unit is deactivated. This means that in case of a speed dynamic (speed change) the actual current-consumption is not analyzed and is only analyzed in case of a constant actual speed.

With regard to a reliably determining a constant actual speed of the electric motor, the following criteria can be defined, according to which a setpoint speed gradient equals zero, the filtered setpoint speed gradient is smaller than a predetermined threshold value and in addition the actual speed gradient is smaller than a further threshold value. Only when these conditions are satisfied can the analysis regarding whether or not a requirement for charging the pressure accumulator exists can be performed. This further ensures that the setpoint speed is only permitted to be changed when the filtered setpoint speed gradient has fallen below a further threshold.

Preferably in a cooling mode the cooling hydraulic pump as well as the charging hydraulic pump can be fluidly connected with the low-pressure circuit. On the other hand, in the cooling mode the charging hydraulic pump is decoupled from the high-pressure circuit. In addition in the cooling mode the two hydraulic pumps operate at lower pump load and lower current consumption.

In contrast, in a charging mode the charging hydraulic pump is no longer fluidly connected with the high-pressure circuit but with the high-pressure circuit. In such a charging mode the charging hydraulic pump operates at high pump load and correspondingly high actual current consumption.

For setting the charging mode and the cooling mode, the high-pressure circuit and the low-pressure circuit can be connected via a bypass line with integrated control valve. The control valve can be adjusted in dependence on the accumulator pressure without external energy input, i.e., automatically, between a charging position and a cooling position. In the charging position the hydraulic system operates in the above-defined charging mode. In the cooling position on the other hand the hydraulic system operates in the above-defined cooling mode.

According to the above description the accumulator pressure in the high-pressure circuit acts as a control pressure with which the valve position of the control valve can be adjusted. The control valve is hereby automatically switched into its charging position, when the accumulator pressure in the high-pressure circuit falls below a lower threshold value. Vice versa the control valve automatically assumes its cooling position when the accumulator pressure in the high-pressure circuit exceed an upper threshold value.

As mentioned above, for recognizing a requirement for charging the pressure accumulator, the actual current consumption detected by the current measuring device is compared with a reference value. The reference value can be determined based on a reference value polynomial stored in the control device, in which an appropriate current consumption reference value can be read out in dependence on the actual speed.

The above-mentioned reference value polynomial can be generated in an initialization phase, for example when initially starting driving operation of the vehicle. In such an initialization phase the respective corresponding actual current consumption can be detected in a current operating mode i.e., in a cooling mode time interval or in a charging mode time interval, at different actual rotational speeds (and depending on the circumstances different temperatures). From these value pairs the reference value polynomial can then be determined.

During the initialization phase a reference value of the recognition of the pressure requirement for charging the accumulator is not yet available. In order to nevertheless recognize a requirement for charging the pressure accumulator an analysis unit of the control device can alternatively determine a pressure requirement for charging the accumulator from a comparison of an actual current consumption and a filtered value of the actual current consumption. When the difference of the actual current consumption and the filtered value of the actual current consumption exceeds a predetermined value this allows concluding that the control valve has switched from the cooing position (with corresponding higher actual current consumption) to the charging position. When on the other hand the difference between the actual current consumption and the filtered value of the actual current consumption falls below a predetermined value this allows concluding that the control valve has switched from the charging position to the cooling position.

For a proper detection of the requirement for charging the pressure accumulator during the initialization phase, the control device can have a program module. This program module detects whether the hydraulic pumps run at constant speed. When the speed is constant the above-mentioned analysis unit can be activated. On the other hand when the speed is not constant the above mentioned analysis unit can be deactivated.

After the generation of the reference value polynomial during the initialization phase the requirement for charging the pressure accumulator can be determined from the above-mentioned comparison between the actual current consumption with the corresponding reference value.

When there is neither a requirement for cooling nor a requirement for charging, the control device can control the electric motor to run at a test speed, which is much lower than the charging setpoint speed and the cooling setpoint speed. The test speed can correspond to a minimal speed at which a proper detection and signal processing of the actual current consumption and the actual speed is ensured. In this way the energy consumption during control of the hydraulic system can be reduced.

For further reducing the energy consumption, the control device can lower the setpoint speed for the electric motor for a defined standstill time period to zero when neither a requirement for charging the pressure accumulator nor a requirement for cooling exists. After expiration of this standstill time period the control device can control the electric motor again to run at the above-mentioned test speed.

For reasons of operational safety, the duration of the standstill time period can be selected so that the electric motor is controlled again to run at the test speed prior to the next requirement for charging the pressure accumulator. In light of the foregoing the control device can have a pressure model unit for determining the standstill time period. The pressure model unit can detect the actuator actuations during the entire time of operation and assign each of the actuator actuations a partial pressure loss. The respective partial pressure loss correlates with the withdrawal of hydraulic fluid from the high-pressure circuit associated with an actuator actuation. The pressure model unit can model the temporal course of the accumulator pressure during the standstill time period based on the detected actuator actuations. When reaching a minimal pressure in the pressure model, the control device can control the shared electric motor to run at the test setpoint speed and to thereby end the standstill time period.

As mentioned above the time course of the accumulator pressure can be determined based on the actuator actuations. In addition also the pressure loss due to basic leakage can be taken into account when generating the pressure model. The term basic leakage means the hydraulic fluid loss resulting independent of the actuator actuation, for example due to valve gaps. The basic leakage is associated with pressure losses, which continuously lower the accumulator pressure in the high-pressure circuit, i.e., with substantially constant slope, independent of the actuator actuations. In contrast an actuator actuation leads to a more or less abrupt withdrawal of hydraulic fluid from the high-pressure circuit, which leads to an substantially abrupt reduction of the accumulator pressure by a pressure difference (upper threshold value minus lower threshold value) corresponding to the oil withdrawal.

For modeling the time course of the accumulator pressure, the pressure model unit can estimate or determine the above-mentioned basic leakage slope in the time period between two recognized requirements for charging. For determining the slope as a function of basic leakage the control device can detect the time interval between the end time point of the charging mode and the starting time point of a subsequent charging mode. At the end time point of the charging mode the high-pressure accumulator circuit as an accumulator pressure, which corresponds to the upper threshold value. In contrast the accumulator pressure is reduced until the start time point of the subsequent charging mode to the lower threshold value by a known pressure difference (upper threshold value minus lower threshold value). From this known pressure difference (minus the partial pressure losses due to actuator actuations in the time interval) the slope can be determined in a simple manner based on basic leakage.

The embodiments and refinements of the invention explained above and/or set forth in the dependent claims can be used individually or in any combination—except for example in cases of clear dependencies or irreconcilable alternatives.

BRIEF DESCRIPTION OF THE DRAWING

In the following the invention and its advantageous embodiments and refinements as well as their advantages are explained in more detail by way of drawings.

It is shown in.

DETAILED DESCRIPTION OF PREFERRED EMBODIMENTS

Figure 1:
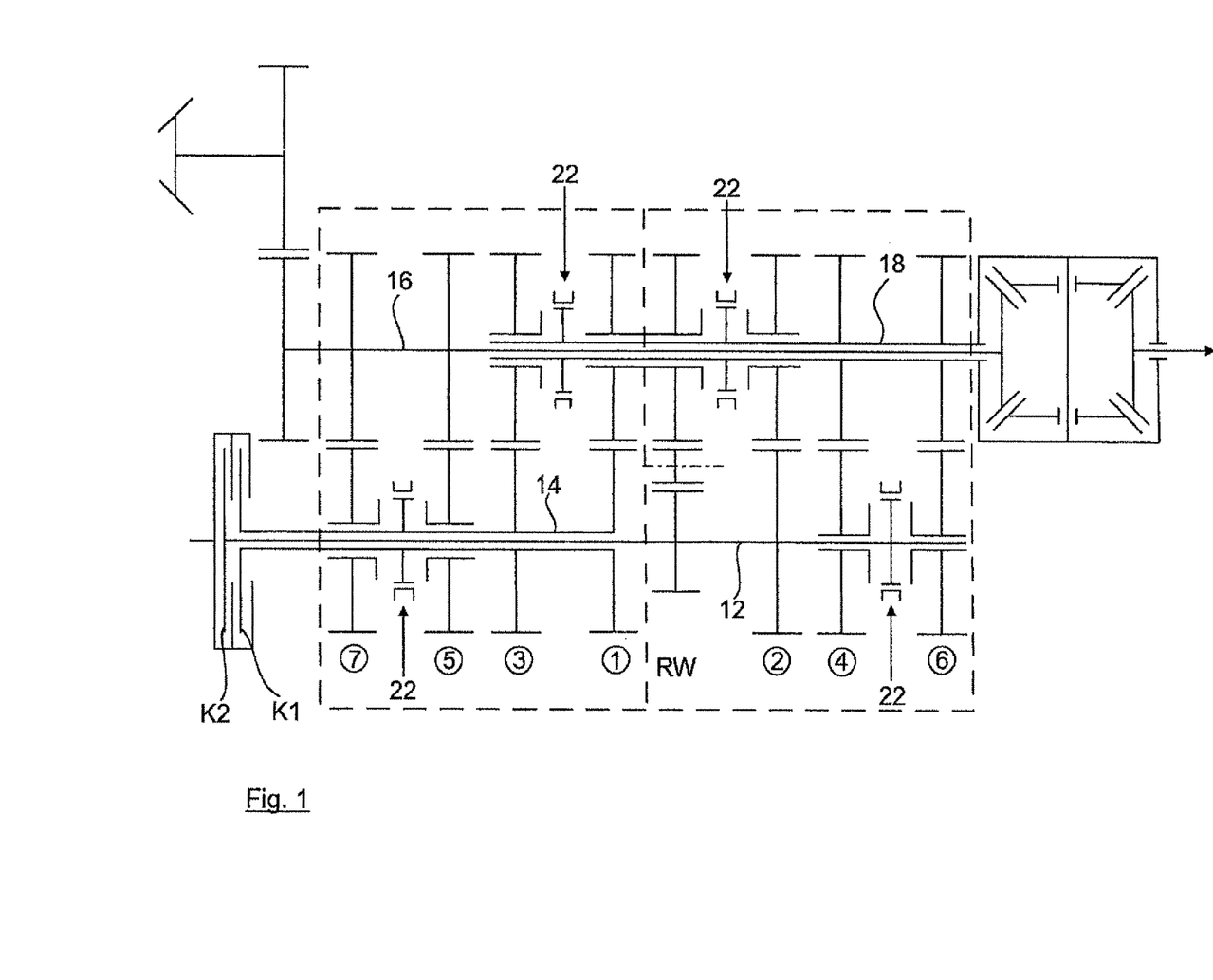
FIG. 1 a block diagram of a dual-clutch transmission for a motor vehicle with seven forward gears and a reverse gear.

FIG. 1 shows a schematic diagram of a dual-clutch transmission for a motor vehicle with all-wheel-drive. The dual-clutch transmission has seven forward gears (see the encircled digits 1 to 7) and a reverse gear RW. In the following the dual-clutch transmission is only described to the degree necessary to understand the invention. The dual-clutch transmission has two input shafts 12, 14, which are arranged coaxial to each other and are alternately connectable with the drive, for example an internal combustion engine, via two hydraulically actuatable multi-disc clutches K1, K2. The input shaft 14 is configured as a hollow shaft in which the input shaft 12, which is configured as solid shaft, is guided. The two input shafts 12, 14 output via gearwheel sets of the forward gears and the reverse gear onto a coaxially arranged output shaft 16 and an intermediate shaft 18, which is configured as hollow shaft. The gearwheel sets of the forward gears 1 to 7 each have fixed gearwheels and idler gearwheels, which can be switched via actuators 22. The actuators 22 can for example be dual-clutch synchronous clutches, which in a neutral position can each switch two neighboring idler gearwheels.

Figure 2:
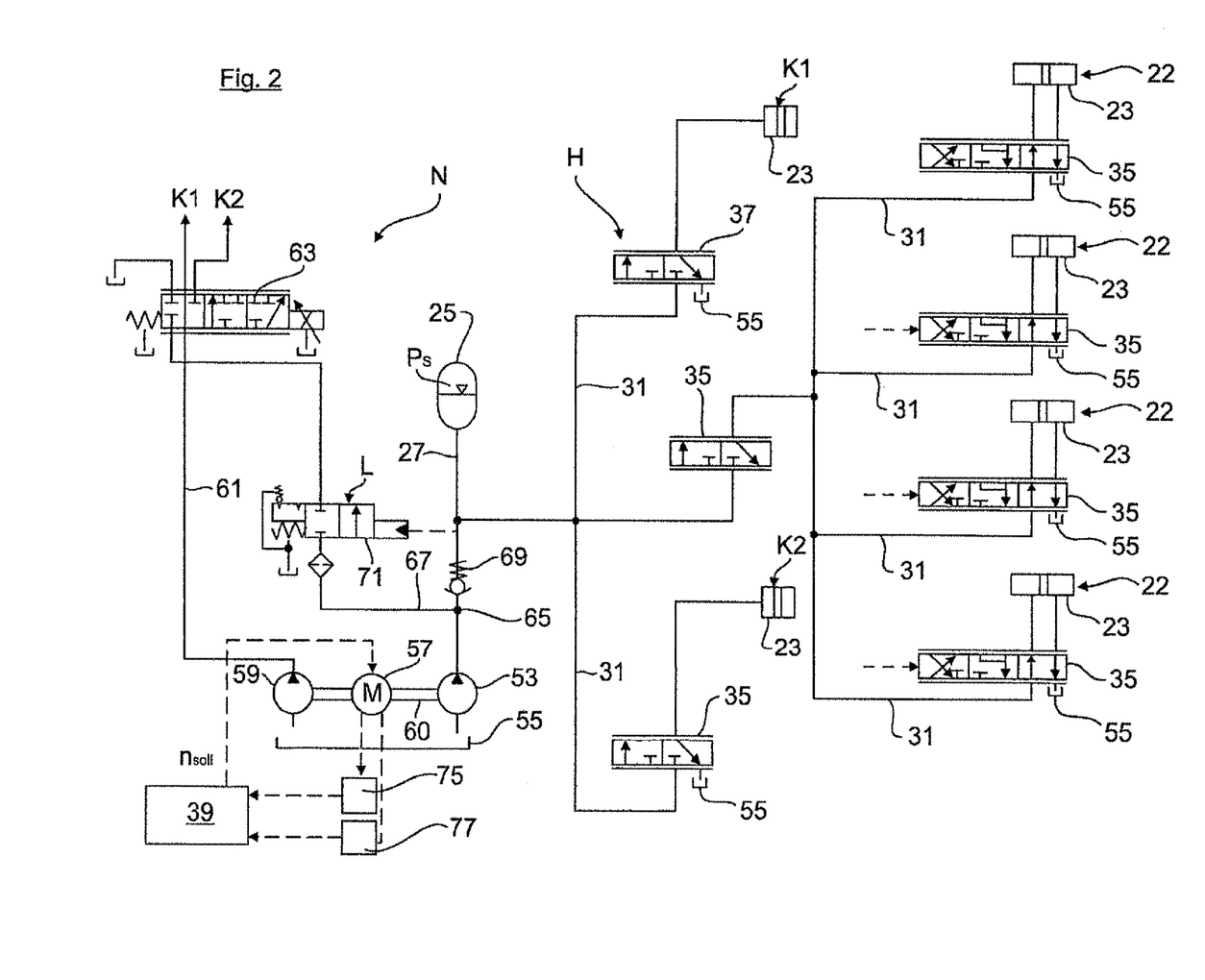
FIG. 2 the hydraulic system of the dual-clutch transmission of FIG. 1.

FIG. 2 shows the hydraulic system of the dual-clutch transmission in a very simplified block diagram. By way of the hydraulic system the hydraulic cylinders 23 of the clutches K1, K2 and the actuators 22 are actuated. According to FIG. 2 the hydraulic system has a high-pressure circuit H and a low-pressure circuit N. In the high-pressure circuit H, the clutches' K1, K2 hydraulic cylinders 23 contained in the high pressure circuit and the actuators 22 can be impinged with an accumulator pressure $p_s$ via a pressure accumulator 25, which pressure can be in the range of for example 30 bar. For this a main line 27, which is connected to the pressure accumulator 25, is guided to the hydraulic cylinders 23 via not further described partial lines 31. In the partial lines 31 respective control valves 35 are arranged.

The control valves 35 can be controlled via a central control device 39 in a not further shown manner.

The hydraulic system also has a charging hydraulic pump 53, which on the input side is connected with an oil sump 55. The charging hydraulic pump 53 can be controlled by the control unit 39 for charging the pressure accumulator 25 via the electric motor 57. In addition the charging hydraulic pump 53 together with the cooling hydraulic pump 59 is arranged on a common drive shaft 60, which is driven by the electric motor 57. On the output side the cooling hydraulic pump 59 is connected with a low-pressure line 61, which leads to a distributor valve 63. Depending on the position of the distributor valve 63, the hydraulic fluid can be returned to the first and/or second clutch K1, K2 and then into the oil sump when a requirement for cooling exists.

According to FIG. 2, the main line 27 of the high-pressure circuit H branches off at a branching point 65 into a bypass line 67, which is connected with the low-pressure line 61 of the low-pressure circuit N. Downstream of the branching point 65, a later described check valve 69 is arranged. In addition a control valve 71 is integrated in the bypass line 67. The control valve 71 can be switched between a charging position L shown in FIG. 2 and a cooling position K in dependence on the accumulator pressure $p_s$ in the high-pressure circuit. The accumulator pressure $p_s$ in the high-pressure circuit H acts as control pressure with which the control valve 71 can be switched without external energy input, i.e., automatically. The control valve 71 is hereby configured so as to assume the charging position L when the accumulator pressure $p_s$ in the high-pressure circuit H falls below a lower threshold value $P_{s,\ low}$ (FIGS. 8 and 9), for example 25 bar. In addition the control valve 71 automatically assumes its cooling position K when the accumulator pressure $p_s$ exceeds an upper threshold value $P_{s,\ up}$ (FIGS. 8 and 9) for example 28 bar.

During driving operation, pressure losses occur due to actuation of the clutches K1, K2 and the actuators 22. In addition further pressure losses occur due to basic leakage, i.e., due to valve gaps or the like in the high-pressure circuit H. As a result the accumulator pressure $p_s$ is reduced during driving operation. In the case the accumulator pressure $p_s$ falls below the lower threshold value $p_{s,\ low}$ (when a requirement for charging the pressure accumulator exists) the control valve 71 automatically assumes its charging position L (FIG. 2). When recognizing the requirement for charging the pressure accumulator, the control device 39 controls the electric motor 57 according to FIG. 6 to run at a charging setpoint speed $n_{setpoint,\ charging}$. As a result the charging hydraulic pump 53 can charge the pressure accumulator 53. In such a charging mode the charging hydraulic pump 53 operates with high pump load and therefore with correspondingly high actual current consumption $I_{actual}$. When the accumulator pressure $P_s$ exceeds the upper threshold value $p_{s,\ up}$ (i.e., a requirement for charging the pressure accumulator no longer exists) the control valve 71 automatically assumes its cooling position K. In the cooling position K the charging hydraulic pump 53 pumps hydraulic oil into the low-pressure circuit N via the now open bypass line 67. At the same time the high-pressure circuit H is closed pressure tight via the check valve 69. Correspondingly the charging hydraulic pump 53 no longer operates with a high pump load but with a reduced pump load and correspondingly with a reduced actual current consumption $I_{actual}$.

Figure 3:
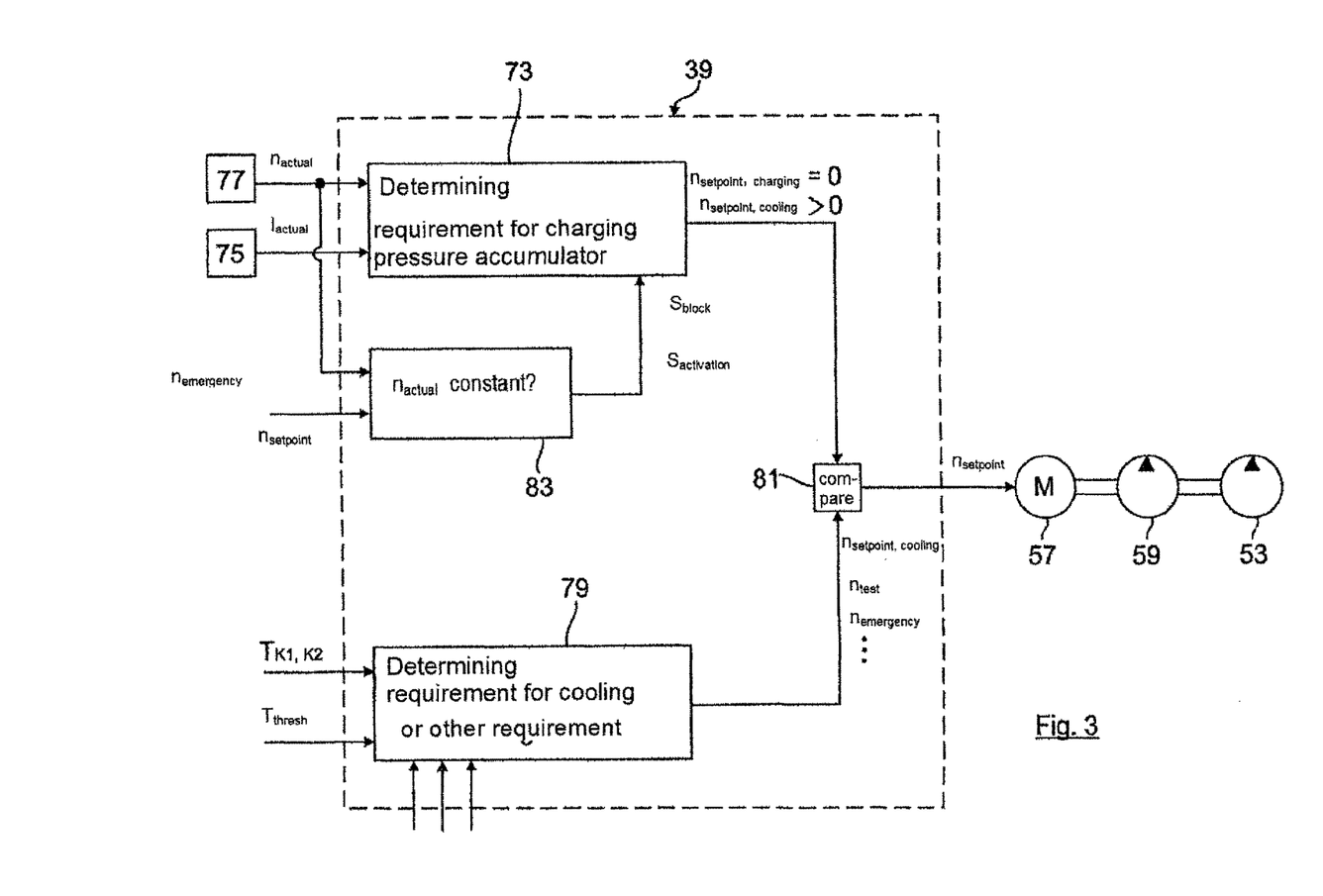
FIG. 3 program modules of the control device for controlling the electric motor of the hydraulic pumps of the hydraulic system in a strongly simplified schematic diagram.
Figure 5:
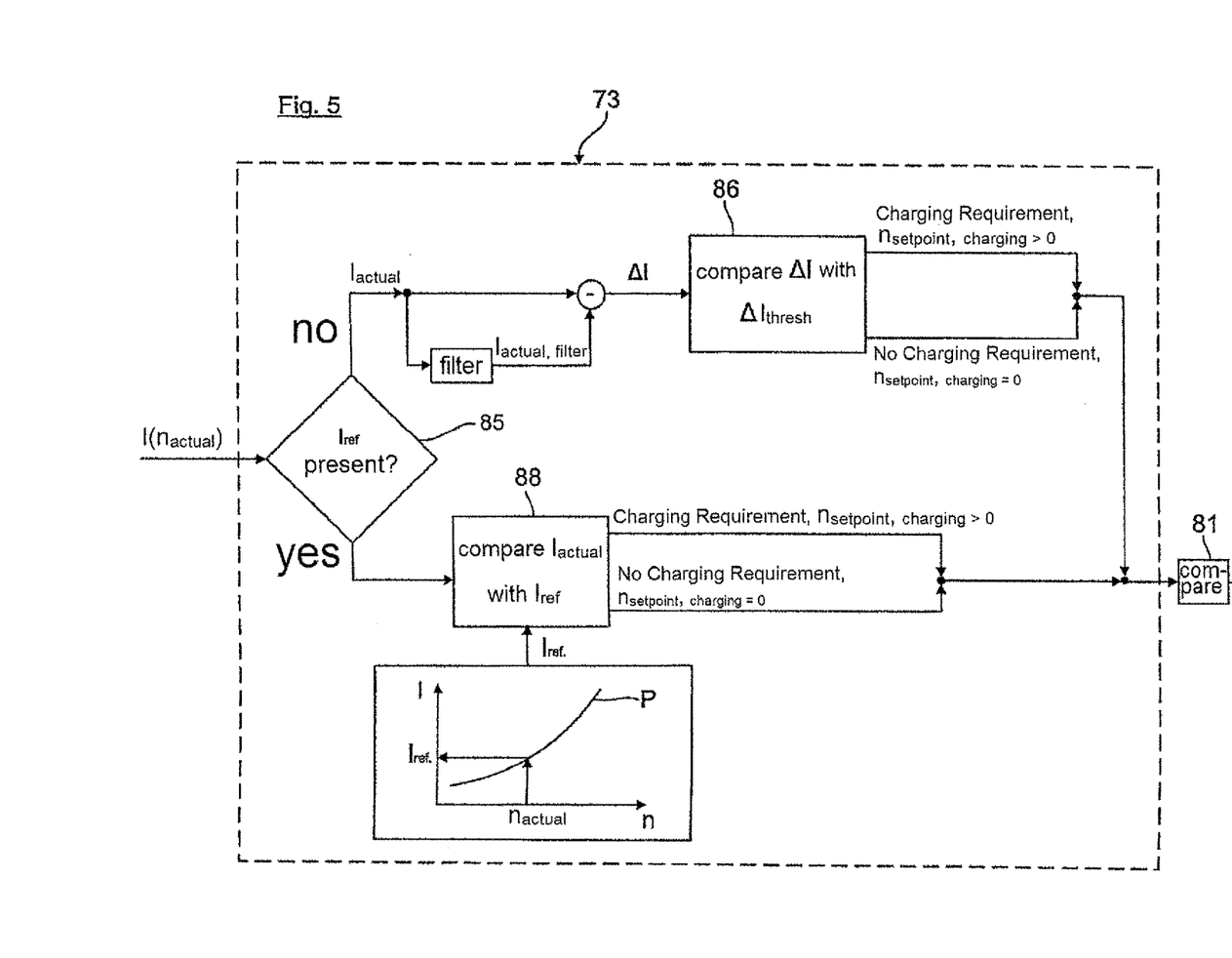
FIG. 5 an analysis unit of the control device.

As mentioned above when recognizing a requirement for charging the pressure accumulator charging, the control device 39 controls the electric motor 57 to run at a charging setpoint speed $n_{setpoint\ charging}$. For recognizing such a requirement for charging the pressure accumulator, the invention does not require a pressure sensor in the high-pressure circuit H or a charging sensor in the control valve 71. Instead the control device 39 has an analysis device 73 (FIGS. 3 and 5). According to FIG. 2, the analysis device 73 is in signal communication with a current-measuring device 75 integrated in the motor control unit, which current measuring device detects an actual current consumption $I_{actual}$ of the electric motor 57 and with a speed sensor 77 which detects an actual speed $n_{actual}$ of the electric motor 57. When a requirement for charging the pressure accumulator is determined, the analysis unit 73 generates a charging setpoint speed$_{setpoint,\ charging}$. When no requirement for charging the pressure accumulator exists, the analysis unit 73 does not generate a setpoint speed, i.e., the charging speed $n_{setpoint,\ charging}$ is set to zero.

According to FIG. 3, the control device 39 also has a further analysis unit 79 with which a requirement for cooling the clutches K1, K2 or another requirement is recognized. Overall the analysis unit 79 can recognize multiple requirements depending on different input parameters. Depending on the recognized requirement, the analysis unit 79 for example generates a cooling setpoint speed $n_{setpoint\ cooling}$ shown in FIG. 3, an emergency speed $n_{emergency}$ or another setpoint speed. In the analysis unit 79 shown in FIG. 3 a clutch temperature $T_{K1,\ K2}$ is exemplary compared with a predetermined threshold temperature $T_{thresh}$. When the clutch temperature $T_{K1,\ K2}$ exceeds the threshold temperature $T_{thresh}$, a requirement for cooling is recognized and correspondingly a cooling setpoint speed $n_{setpoint\ cooling}$ is generated. When no requirement for cooling exists the test speed $n_{test}$ is generated. The speeds generated in the analysis units 73 and 79 are transmitted to a comparer module 81. The comparer module 81 prioritizes the individual speed requests according to relevance and according to speed. This means a speed request of a lower speed that was categorized as relevant can be prioritized over a sped request of a greater speed, which was categorized as less relevant. The speed request prioritized by the comparer module 81 is transmitted to the electric motor 57 as setpoint speed $n_{setpoint}$.

Figure 4:
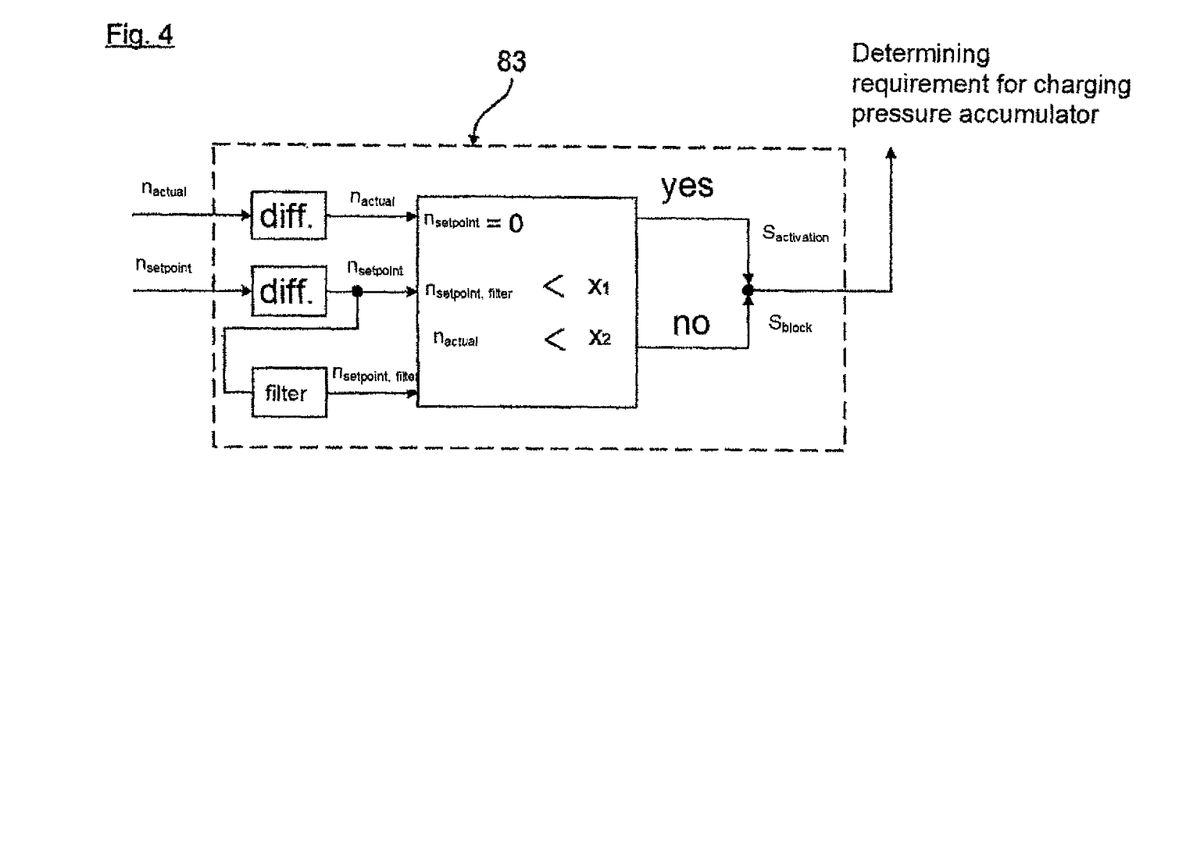
FIG. 4 a constant-speed unit of the control device.

As further shown in FIG. 3 a constant-speed unit 83 is assigned to the analysis unit 73 for recognizing a requirement for charging the pressure accumulator. By means of this unit 83 it is detected whether the hydraulic pumps 53, 59 are running at constant speed. In the absence of a constant actual speed (i.e. when the speed changes) the analysis unit 73 is deactivated via a stop signal $S_{block}$. On the other hand in case of a constant actual speed, the analysis unit 73 is activated with an activation signal $S_{activation}$. The constant-speed unit 83 is shown in more detail in FIG. 4. Accordingly a constant speed is concluded when the setpoint speed gradient $\dot{n}_{setpoint}$ equals zero and the filtered setpoint speed gradient $\dot{n}_{setpoint\ filter}$ is lower than a threshold value x. In addition the actual speed gradient $\dot{n}_{actual}$ has to be smaller than a further threshold value $x_2$ as shown in the block diagram of FIG. 4.

FIG. 5 shows the analysis unit 73 for recognizing a requirement for charging the pressure accumulator in a more detailed block diagram. According to this it is first determined in a program module 85 whether reference values $I_{ref}$ for a comparison between an actual current consumption $I_{actual}$ of the electric motor 57 are already present. If this is not the case an initiation phase is started. In the initiation phase the electric motor 57 is controlled to run at a high speed. In addition according to FIG. 5 a requirement for charging the pressure accumulator is determined in a comparer module 86, i.e. from a difference ΔI of the actual current consumption $I_{actual}$ with a filtered value $I_{actual, filter}$ of the actual current consumption $I_{actual}$. When the difference $\Delta I$ between the actual current consumption $I_{actual}$ and the filtered value $I_{actual\ filter}$ is at zero no sudden current consumption change has resulted from the switching of the control valve 71 (due to different pump loads).

On the other hand, in such an automatic switching of the control valve 712 a significant difference exists between the actual current consumption $I_{actual}$ and the filtered value $I_{actual\ filter}$. When such a significant difference is detected it can be recognized (in dependence on the algebraic sign of the difference) when the control valve 71 is in its charging position L or in its cooling position K (i.e., whether a requirement for charging the pressure accumulator exists or not). When recognizing such a requirement for charging the pressure accumulator, the control device 39 controls the electric motor 57 to run at the charging setpoint speed $n_{setpoint,\ charging}$ in order to ensure a proper charging process of the pressure accumulator 25. When no requirement for charging the pressure accumulator exists, no setpoint speed is generated in the comparer module, i.e., the setpoint speed $n_{setpoint\ charging}$ is set to zero.

In the above-described initiation phase additionally a reference polynomial P, indicated in FIG. 5, which can be stored in the control unit 39, is determined, i.e. on the basis of value pairs consisting of different actual speeds and correlating actual current consumptions of the electric motor 57. The reference polynomial P, however, has to be generated either continuously during a cooling mode time interval or continuously during a charging mode time interval in order to obtain a meaningful reference polynomial P with the detected value pairs.

After generating the reference polynomial P (for example continuously during the cooling mode time interval), the requirement for charging the pressure accumulator is no longer recognized by monitoring the difference $\Delta I$ between the actual current consumption $I_{actual}$ and the filtered value $I_{actual\ filter}$ (i.e. in the comparer module 86) but rather in a comparer module 88, i.e., from a comparison of the actual current consumption $I_{actual}$ and the correlating reference value $I_{ref}$ (is determined from the reference polynomial P). For this, according to FIG. 5 the actual current consumption $I_{actual}$ is transmitted via the program module 85 to the comparer module 88. When the actual current consumption $I_{actual}$ approximately corresponds to the corresponding reference value $I_{ref}$ the charging hydraulic pump 53 does not work against the high accumulator pressure $p_s$ but with low actual current consumption against the relatively low pressure in the low-pressure circuit N. Correspondingly the control valve 71 is in its cooling position K and the accumulator pressure $p_s$ is still sufficient so that no pressure requirement for charging the accumulator exists. In this case no speed request is generated by the comparer module 88, i.e., the setpoint speed $n_{setpoint\ charging}$ is set to zero.

In the case that the actual current consumption $I_{actual}$ is significantly higher than the corresponding reference value $I_{ref}$, the charging hydraulic pump 53 works against the high accumulator pressure $p_s$ in the high-pressure circuit H (with correspondingly high current consumption). In this case a requirement for charging the pressure accumulator is recognized in the comparer module 88 and a charging setpoint speed $n_{setpoint,\ charging}$ is generated and transmitted to the comparer module 81.

Figure 6:
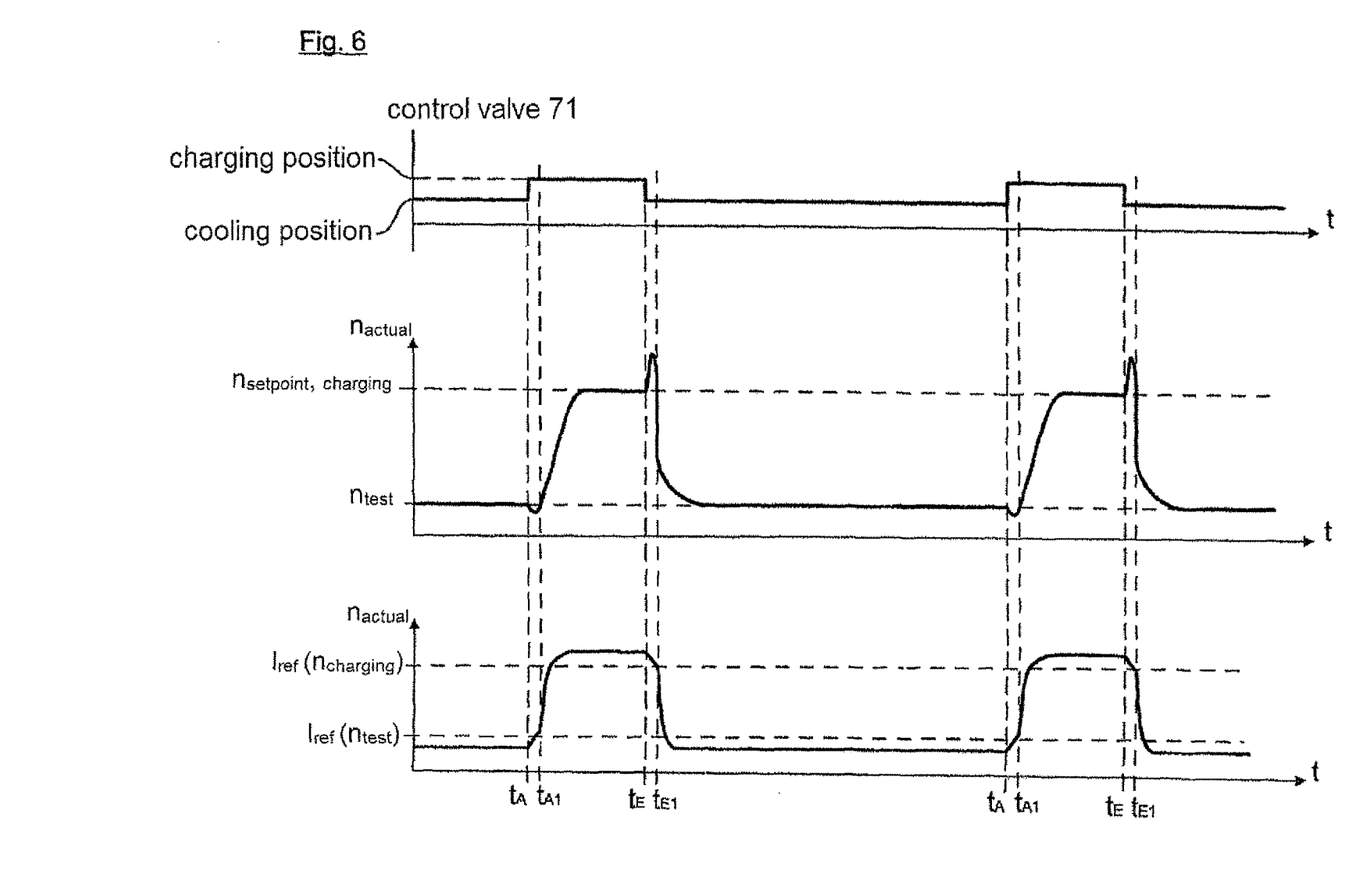
FIG. 6 a diagram showing the temporal courses of relevant parameters during operation of the hydraulic system.

FIG. 6 shows a diagram which illustrates the temporal courses of the relevant parameters in the hydraulic system, i.e., on top the temporal course of automatically occurring switching processes of the switching valve 71, in the center of the image the temporal course of the actual speed $n_{actual}$ and on the bottom the temporal course of the actual current consumption $I_{actual}$. According to this the control valve 71 switches at a time point $t_A$ from the cooling position K (i.e. the non-charging position) into the charging position L and at a time point $t_E$ again into its cooling position K. In the present operating situation neither a requirement for cooling nor a requirement for charging the pressure accumulator charging nor any other requirement exists up to the time point $t_A$. The control device 39 therefore controls the electric motor 57 to run at a setpoint test speed $n_{test}$ (for example 600 rpm), which results in a corresponding actual speed $n_{actual}$.

At the time point $t_A$ the control valve 71 automatically assumes its charging position L. Upon reaching the charging position L first only the actual current consumption $I_{actual}$ increases—at still set test rotational speed $n_{test}$. This actual current increase results (at still set test rotational speed $n_{test}$) solely from the load increase associated with the change into the charging position L. Only when at a time point $t_A$ (FIG. 6) the comparer module 88 (FIG. 5) recognizes that the actual current consumption $I_{actual}$ has exceeded the reference value $I_{ref}(n_{test})$ the comparer module 88 (FIG. 5) generates a speed request. Correspondingly the speed is increased to the set point charging speed $n_{setpoint\ charging}$, whereupon a corresponding actual speed $n_{actual}$ is established (FIG. 6, center of image). The increase of the setpoint speed to the charging speed $n_{setpoint\ charging}$ occurs at the time point $t_{A1}$ and is associated with a further increase of the actual current consumption $I_{actual}$. Thus two actual current increases occur, i.e., a first current increase due to the load increase (up to the time point $t_{A1}$) and a second current increase due to the setpoint speed increase.

At the time point $t_E$ the control valve 71 automatically switches back to its cooling position (or non-charging position) K. When the constant-speed unit detects the presence of a constant speed it is again detected based on the actual current consumption $I_{actual}$ whether a requirement for charging the pressure accumulator exists or not. When reaching the cooling position K first—while the charging setpoint speed $n_{setpoint\ charging}$ is still generated by the comparer module 88—only the actual current consumption $I_{actual}$ decreases. This actual current decrease results (while the target charge rotational speed $n_{setpoint\ charging}$ is still generated by the comparer module 88) solely from the load decrease associated with the change into the cooling position K. Only when the comparer module 88 at a time point $T_{E1}$ (FIG. 6) recognizes that the actual current consumption $I_{actual}$ has fallen below a reference value $I_{ref}(n_{charging})$, the setpoint speed is reduced to the test speed $nt_{est}$. The speed reduction to the test speed $n_{test}$ thus occurs at the time point $T_{E1}$ and is associated with a further actual current decrease. Thus two actual current decreases result, i.e., a first current decrease due to the load decrease (up to the time point $T_{E1}$) and a second current decrease due to the rotational speed reduction.

In the preceding exemplary embodiment of the control device 39, the electric motor 57 is controlled to run at a setpoint test speed $n_{test}$ when neither a requirement for charging the pressure accumulator nor a requirement for cooling or other requirement is recognized. The target test speed $n_{test}$ is selected so that the actual current consumption $n_{actual}$ and the actual speed $n_{actual}$ can be rekiably measured. A disadvantage hereby is that the electric motor 57 has to be permanently operated at least at this setpoint test speed $n_{test}$ when no requirement for charging the pressure accumulator exists and no requirement for cooling or other requirement exists, in order to ensure the ability to measure the actual current consumption $I_{actual}$ and the actual rotational speed $n_{actual}$ of the electric motor 57.

Figure 7:
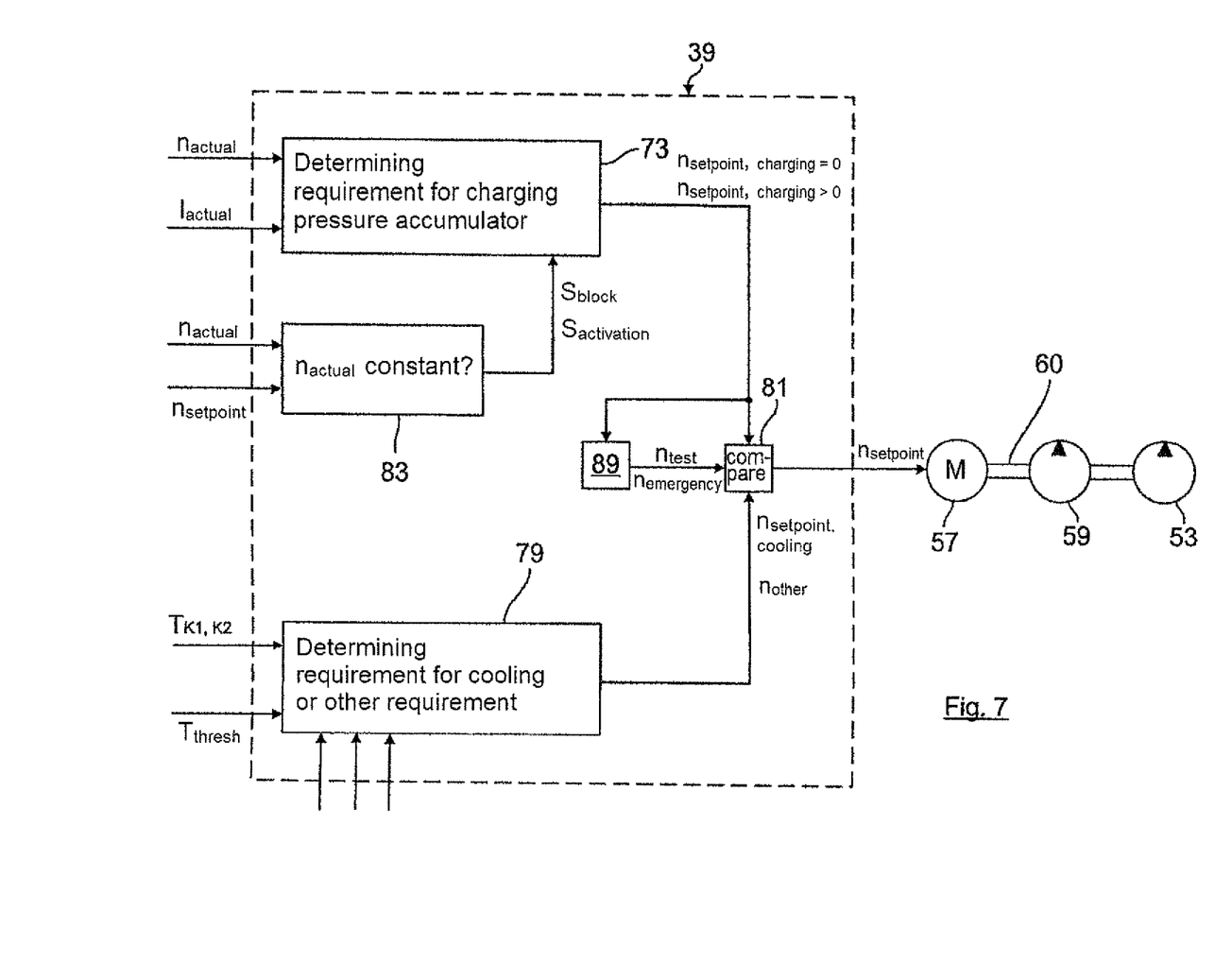
FIG. 7 in a view corresponding to FIG. 3 a control device according to the second exemplary embodiment.
Figure 8:
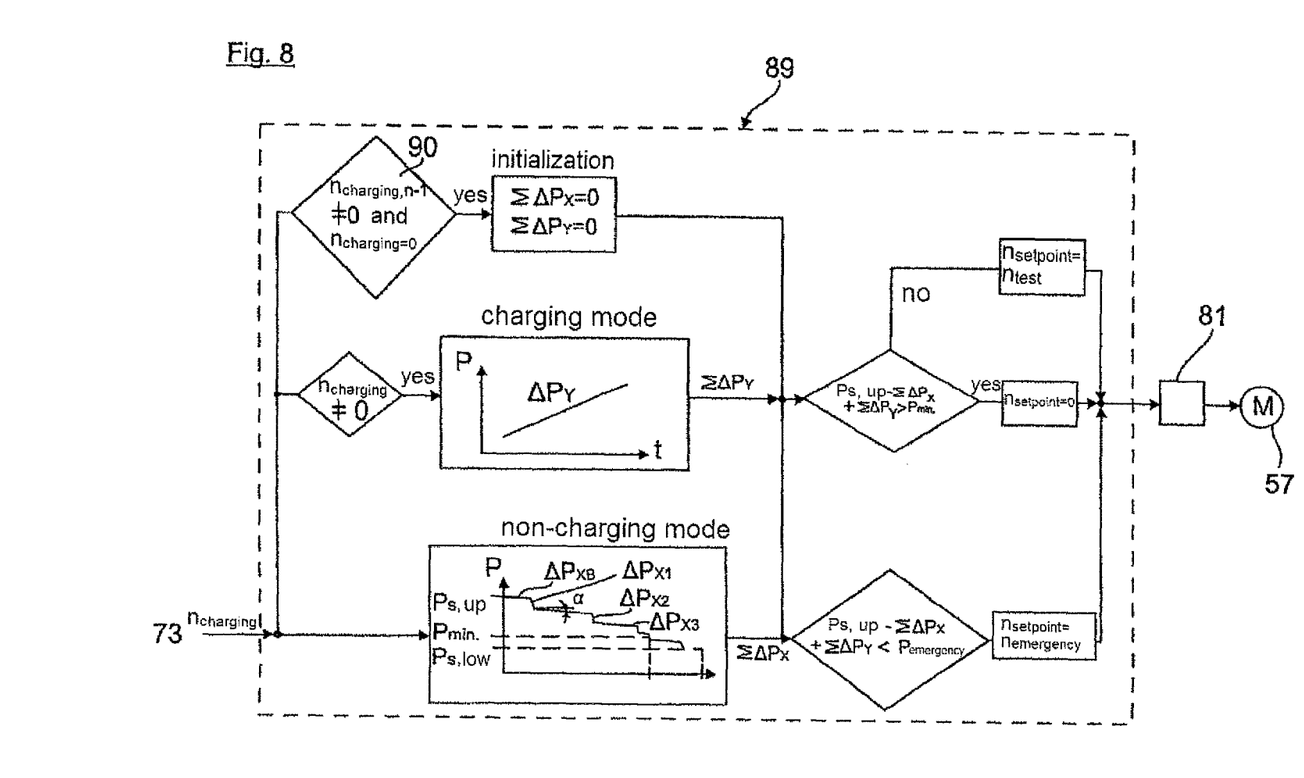
FIG. 8 a pressure model unit of the control device shown in FIG. 7.
Figure 9:
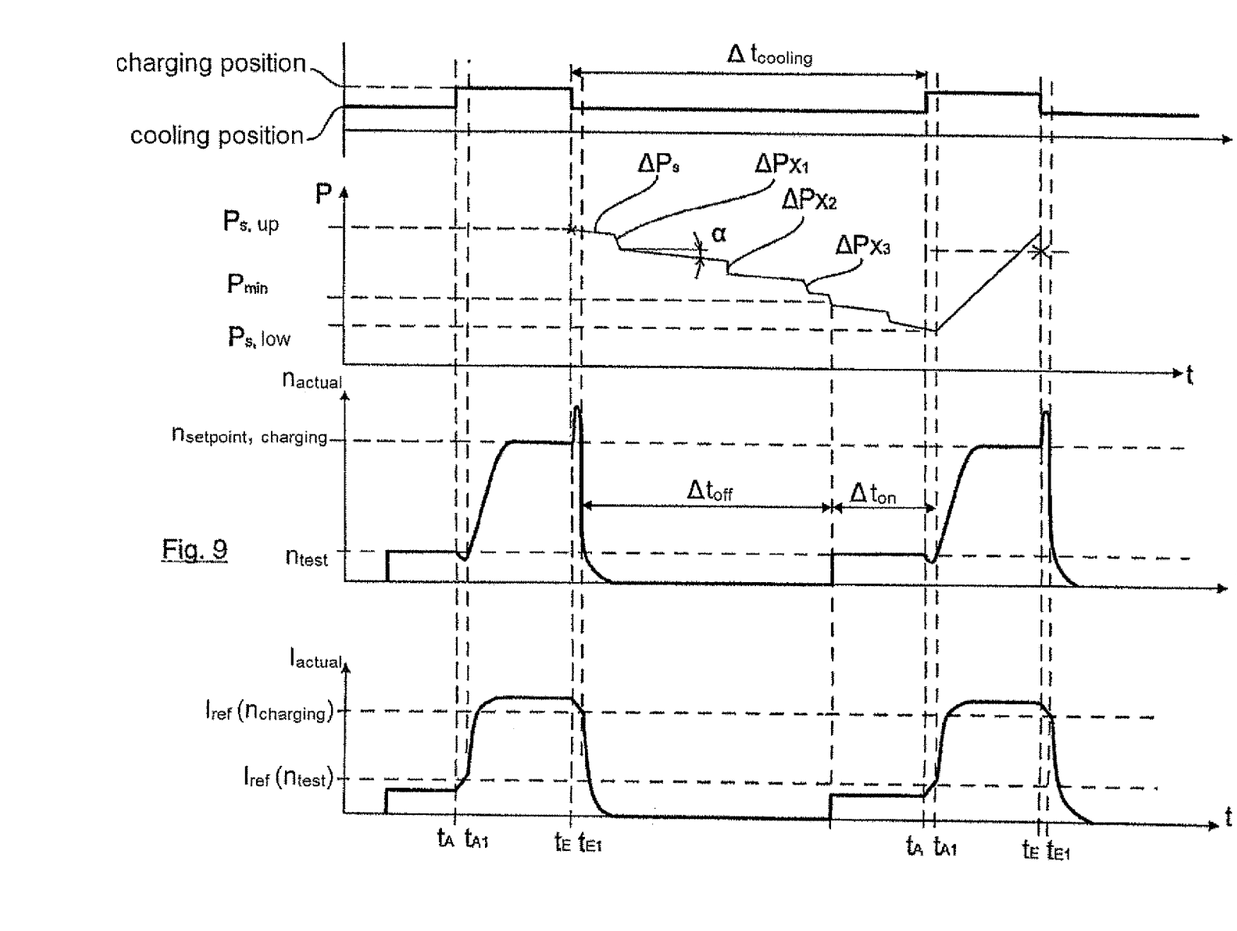
FIG. 9 a diagram showing the temporal courses of relevant parameters during operation of the hydraulic system according to the second exemplary embodiment.

In contrast to this, FIGS. 7, 8 and 9 show a control device 39 according to the second exemplary embodiment. The general construction and the functioning of this control device 39 are essentially identical to that of the preceding exemplary embodiment. In contrast to the preceding exemplary embodiment, the control device 39 according to FIGS. 7 to 9 can lower the setpoint speed $n_{setpoint}$ for a predetermined standstill time period $\Delta t_{off}$ (FIG. 9) as low as zero when neither a requirement for charging the pressure accumulator nor a requirement for cooling nor other requirement is recognized. After expiration of this standstill time period $\Delta t_{off}$ the control device 39 controls the electric motor 57 at least with the target test rotational speed $n_{test}$ in order to enable measuring by the control device again.

For determining the standstill time period $\Delta t_{off}$ the control device 39 additionally has a pressure model unit 89. The pressure model unit 89 is according to FIG. 7 for example in signal communication with the signal input of the comparer module 81. When the standstill conditions (i.e., neither a requirement for charging the pressure accumulator nor a requirement for cooling and other requirement exists) is satisfied the pressure model unit 89 sets the setpoint speed $n_{setpoint}$ to zero. The standstill time period $\Delta t_{off}$ begins at the end time point $t_E$ of the charging mode (at the time point at which the control valve 71 automatically switches from the charging position L into the cooling position or K).

In the pressure model unit 89 according to FIG. 8, the temporal course of the accumulator pressure $p_s(t)$ is modeled during the entire operating time. For this the pressure model unit 89 detects every event relevant for the pressure course in the high-pressure circuit H that leads to an increase (i.e., in FIG. 8 the partial pressure differences $\Delta p_y$) or to a reduction (i.e., in FIG. 8 the partial pressure differences $\Delta p_x$) of the accumulator pressure $p_s$. Depending on the event the partial pressure differences have positive or negative algebraic signs. The partial pressure differences $\Delta p_x$ are exemplary linked with actuator actuations. Each of these actuator actuations is assigned a partial pressure difference $\Delta px_1$, $\Delta px_2$, ... (FIG. 8 or 9). The partial pressure differences $\Delta px_1$, $\Delta px_2$ ... exemplarily shown in FIGS. 8 and 9 correlate respectively with the hydraulic fluid withdrawals from the high-pressure circuit H associated with the actuator actuations. In addition also the pressure loss $\Delta p_{xB}$ due to permanent basic leakage is taken into account in the modeled temporal course of the accumulator pressure $p_s(t)$.

According to FIG. 8 or 9 the initial value of the temporal accumulator pressure course corresponds to the already mentioned upper threshold value $p_{s,\ up}$ of the control valve 71. When reaching a minimal pressure $p_{min}$ the standstill time period $\Delta t_{off}$ ends so that the control device 39 controls the electric motor 57 to run at the test speed $n_{test}$. Subsequently it is determined with the analysis unit 73 whether a requirement for charging the pressure accumulator exists or not. The requirement for charging the pressure accumulator, however is only determined when the constant-speed conditions are satisfied. For a meaningful measurement of the actual current consumption it is also advantageous when a defined minimal measurement time (measuring window) exists in which the constant conditions are satisfied.

In FIG. 8 the switching timer point $t_E$ is recognized by means of the program module 90 of the pressure model unit 89, at which the control valve 71 is switched from its charge position L into its non charge position/cooling position K. The recognition of the switching time point $t_E$ occurs by means of the a testing of the actually present charging setpoint speed $n_{sepoint,\ charging}$ and the charging setpoint speed $n_{sepoint,\ charging}$ n−1 present at a previous measuring time point. When the conditions stored in the program module 90 (i.e., $n_{setpoint,\ charging}$, n−1≠0 and $n_{sepoint,\ charging}$=0) are satisfied, an initialization occurs at which the temporal accumulator pressure course $p_s(t)$ modeled in the pressure model is reset to its initial value, i.e., to the upper threshold value $p_{s,\ up}$ as shown in the diagram of FIG. 9 with the accumulator pressure charge curve between the time points tA and $t_E$.

As mentioned above the accumulator pressure $p_s$ is reduced during operation for example due to basic leakage pressure losses $\Delta_{pB}$ and pressure losses $\Delta px_1$, $\Delta px_2$ ... due to actuator actuations. Especially the basic leakage losses lead to a continuous reduction with substantially constant slope α (FIG. 8 or 9) of the accumulator pressure course $p_s(t)$. In light of the foregoing the slope α resulting from basic leakage can be approximated as follows: first a time interval $\Delta t_{cooling}$ (FIG. 9) between the end time point $t_E$ of a charging mode and the starting time point $t_A$ of a subsequent charging mode (i.e., the time period between two recognized requirements for charging) is detected. Subsequently the pressure difference between the upper threshold value $p_{s,\ up}$ and the lower threshold value $p_{s,\ low}$ of the control valve 71 is determined by taking the partial pressure differences $\Delta p_y$ or $\Delta p_x$ of the accumulator pressure $p_s$ occurring in the time interval $\Delta t_{cooling}$ into account. From this the slope α can be easily determined, which allows optimizing the modeling of the temporal accumulator pressure course. The accumulator pressure $p_s$ is strongly temperature dependent. For a realistic modeling it is therefore preferred when the temporal accumulator pressure course is modeled by taking this strong temperature dependence into account.

What is claimed is:

1. A hydraulic system for an automatic transmission, comprising:
   a high-pressure circuit comprising a pressure accumulator, at least one clutch, and actuators;
   a low-pressure circuit for cooling the at least one clutch, said low-pressure circuit comprising a cooling hydraulic pump and a charging hydraulic pump which are drivable via a shared electric motor;
   a current measuring device for detecting an actual current consumption of the electric motor;
   a speed sensor for detecting an actual speed of the electric motor;
   a control device having an analysis unit and a constant-speed unit,
   said analysis unit recognizing a requirement for charging the pressure accumulator as a function of the actual current consumption and the actual speed of the electric motor measured by the current measuring device and the speed sensor,
   said control device controlling the electric motor to run at a charging setpoint speed when the analysis unit recognizes a requirement for charging the pressure accumulator or controlling the electric motor to run at a cooling setpoint speed or other setpoint speed when the analysis unit recognizes a requirement for cooling or other requirement,
   said constant-speed unit detecting whether the hydraulic pumps run at a constant speed, wherein when the hydraulic pumps do not run at a constant speed the analysis unit is deactivated and when the hydraulic pumps run at a constant speed the analysis unit is activated.

2. The hydraulic system of claim 1, wherein the analysis unit determines the requirement for charging the pressure accumulator based on a comparison between the actual current consumption and a reference value which is determined based on a reference value polynomial stored in the control device in dependence on the actual speed.

3. The hydraulic system of claim 2, wherein the reference value polynomial is generated in an initialization phase, and wherein in the initialization phase, at different actual speeds the corresponding actual current consumptions are detected as reference values and stored.

4. The hydraulic system of claim 2, wherein the analysis unit recognizes the requirement for charging the pressure accumulator based on a comparison between the actual current consumption and a filtered value of the actual current consumption.

5. The hydraulic system of claim 2, wherein after generation of the reference value polynomial the requirement for charging the pressure accumulator is recognizable from a comparison of the actual current consumption with the reference value.

6. The hydraulic system of claim 1, wherein the constant-speed unit determines that the hydraulic pumps run at a constant speed when a setpoint speed gradient is zero, a filtered setpoint speed gradient is smaller than a threshold value, and an actual rotational speed gradient is smaller than a threshold value.

7. The hydraulic system of claim 1, wherein in a non-charging mode of the hydraulic system, the cooling hydraulic pump and the charging hydraulic pump are fluidly connected with the low-pressure circuit and the charging hydraulic pump is decoupled from the high-pressure circuit, and wherein in the non-charging mode the hydraulic pumps operate at reduced pump load and reduced actual current consumption.

8. The hydraulic system of claim 7, wherein in a charging mode of the hydraulic system, the charging hydraulic pump is fluidly connected with the high-pressure circuit and operates at increased pump load with increased actual current consumption.

9. The hydraulic system of claim 1, wherein the high-pressure circuit and the low-pressure circuit are connected via a bypass line with an integrated control valve, said control valve being configured to automatically switch in dependence on an accumulator pressure in the high-pressure circuit without external energy input between a charging position in which the hydraulic system operates in a charging mode and a non-charging position in which the hydraulic system operates in a non-charging mode.

10. The hydraulic system of claim 9, wherein the control valve automatically assumes the charging position when an accumulator pressure in the high-pressure circuit falls below a lower threshold value and the control valve automatically assumes the non-charging position when the accumulator pressure in the high-pressure circuit exceeds an upper threshold value.

11. The hydraulic system of claim 10, wherein the control device has a pressure model unit which detects during operating time actuations of the actuators or other events that influence a pressure of the accumulator and in dependence on the actuators and other events generates partial pressure differences, wherein at a charging mode end time point, the accumulator pressure in the high-pressure circuit corresponds to the upper threshold value, wherein when exceeding the upper threshold value, the control valve in the bypass line automatically switches from the charging position into a cooling position, wherein the upper threshold value is an initial pressure of the pressure model unit from which the partial pressure differences are subtracted or added.

12. The hydraulic system of claim 11, wherein the partial pressure differences are due to actuation of the actuators and/or loss of hydraulic fluid.

13. The hydraulic system of claim 10, wherein the control device has a pressure model unit which detects during operating time actuations of the actuators or other events that influence a pressure of the accumulator and in dependence on the actuators and other events generates partial pressure differences, wherein the accumulator pressure in the high-pressure circuit is continuously reduced with a substantially constant slope due to pressure loss as a result of loss of hydraulic fluid, and wherein the accumulator pressure is substantially abruptly reduced due to an actuator actuation.

14. The hydraulic system of claim 13, wherein the pressure model unit for simulating the decrease of the accumulator pressure over time estimates or determines the slope.

15. The hydraulic system of claim 14, wherein the pressure model unit calculates the slope based on a time interval between the charging mode end time point and a subsequent charging mode starting time point and based on a pressure difference between the upper threshold value and the lower threshold value of the control valve by taking the partial pressure differences that have occurred in the time interval into account.

16. The hydraulic system of claim 1, wherein in absence of a requirement for cooling or other requirement and also in the absence of a requirement for charging the pressure accumulator, the control device controls the electric motor to run at a test rotational speed for detecting the actual speed and the actual current consumption, said test rotational speed being lower than the charging setpoint speed and the cooling setpoint speed.

17. The hydraulic system of claim 16, wherein in absence of the requirement to charge the pressure accumulator and in absence of the requirement for cooling or other requirement, the control device lowers the setpoint speed to zero for a predetermined time period, and wherein after expiration of the predetermined time period, the control device controls the electric motor to run at least at the test rotational speed.

18. The hydraulic system of claim 17, wherein the control device has a pressure model unit which detects during operating time actuations of the actuators or other events that influence a pressure of the accumulator and in dependence on the actuators and other events generates partial pressure differences, said pressure model unit simulating a decrease of the pressure of the accumulator over time during the predetermined time period as a function of the detected partial pressure differences.

19. The hydraulic system of claim 18, wherein when reaching a minimal pressure in the pressure model unit, the control device controls the electric motor to run at least at a test rotational speed.

20. The hydraulic system of claim 18, wherein the pressure model unit simulates the decrease of the pressure of the accumulator over time additionally on the basis of a pressure loss due to a loss of hydraulic fluid.

21. A motor vehicle, comprising the hydraulic system of claim 1.

22. A method for operating a hydraulic system, comprising:
   determining with a current-measuring device an actual current consumption of an electric motor of a high-pressure circuit of the hydraulic system, said high-pressure circuit further comprising a pressure accumulator, at least one clutch, and actuators, said electric motor driving a respective cooling hydraulic pump and charging hydraulic pump of a low pressure circuit, said low-pressure circuit being configured for cooling the at least one clutch of the high pressure circuit;

determining with a speed sensor an actual speed of the electric motor;

recognizing with an analysis unit of a control device a requirement for charging the pressure accumulator as a function of the actual current consumption and the actual speed of the electric motor measured by the current measuring device and the speed sensor;

controlling the electric motor with the control device to run at a charging setpoint speed when the analysis unit recognizes a requirement for charging the pressure accumulator; or controlling the electric motor to run at a cooling setpoint speed or other setpoint speed when the analysis unit recognizes a requirement for cooling or other requirement;

detecting with a constant-speed unit of the control device whether the hydraulic pumps run at a constant speed; and deactivating the analysis unit when the hydraulic pumps do not run at a constant speed and activating the analysis unit when the hydraulic pumps run at a constant speed.

* * * * *